United States Patent [19]
Pöhler et al.

[11] Patent Number: 4,675,874
[45] Date of Patent: Jun. 23, 1987

[54] TEMPERATURE STABILIZATION OF LASER CAVITIES

[75] Inventors: Manfred Pöhler; Detlef Henschler, both of Halle-Neustadt; Richard Wittig, Halle, all of German Democratic Rep.

[73] Assignee: VEB Kombinat Feinmechanische Werke Halle, Halle, German Democratic Rep.

[21] Appl. No.: 583,169

[22] Filed: Feb. 24, 1984

[30] Foreign Application Priority Data

Feb. 24, 1983 [DD] German Democratic Rep. ... 248226

[51] Int. Cl.$^4$ ............................................. H01S 3/00
[52] U.S. Cl. ......................................... 372/33; 372/34
[58] Field of Search ............................... 372/33, 34, 35

[56] References Cited
U.S. PATENT DOCUMENTS

3,969,688  7/1976  Freiberg et al. ..................... 372/33

*Primary Examiner*—Robert E. Wise
*Attorney, Agent, or Firm*—Horst M. Kasper

[57] ABSTRACT

A system is provided for compensation of maladjustments caused by operational and/or environmental factors in laser resonant cavities of the folded type, which employs a support construction of a light weight construction double T-profile section. The present construction allows the construction of low cost, powerful lasers with substantially reduced mass and volume and of a sufficient temperature stability for industrial applications. A thermal carrier medium flowing through all supports and mountings for all optical components is brought from an ambient temperature to an increased temperature and serves as a control medium for the optical components. In addition, the optical components in each case are disposed on a three point support each employing at least two different thermal expansion coefficient materials, which optical components are adjusted exactly at the increased temperature, and where occurring maladjustments or, respectively the factors causing maladjustments are determined in a suitable way, are evaluated in a corresponding evaluation circuit and are defined as reference values for the temperature of the thermal carrier medium for readjustment of the optical components.

20 Claims, 6 Drawing Figures

TEMPERATURE STABILIZATION OF LASER CAVITIES

BACKGROUND OF THE INVENTION

1. Field of the Invention

The present invention relates to a method, circuit and apparatus for compensation of operationally and/or environmentally caused maladjustments of laser resonant cavities in folded arrangement and employing a support construction for the resonator, which is provided as a preferably vertically disposed double T-profile section produced from relatively light materials.

2. Brief Description of the Background of the Invention Including Prior Art

Conventionally $CO_2$ laser resonant cavities are constructed from expensive thermally stabilized invar constructions, where the lasers have a power range of up to 1000 watts and employ a slow flow of gas. In part even novel materials such as for example surperinvar are employed as construction materials. In addition, it has been attempted to employ massive marble blocks as a stable support for the optical components of a laser resonant cavity. These constructions meet in fact the optical requirements, but they are very expensive and have masses and dimensions which are much too large for industrial applications. In addition, such constructions make it appear that a further increase in the output power of a laser would not make economic sense. On the other hand the developed laser technologies have been extremely useful in industrial applications, in particular the application of $CO_2$ lasers, such that stronger and stronger requirements are posed regarding the reduction of mass and volume. Fulfilling these requirements leads to new requirements regarding the laser resonant cavities and their thermal stabilization.

In order to reduce the construction length, folded path resonant cavities have been developed, which however are much more temperature sensitive compared with the above indicated resonant cavity constructions and which therefore again limit the possibilities of industrial applications. It has been attempted to balance this disadvantage by introduction of additional thermal stabilization provisions for the resonant cavity construction such as use of water, oil and climate insulation and control procedures. Temperature stabilization has been only partially achieved, that is as in the past with a reduction of the temperature range over which the apparatus can be employed. In addition, the steps described have resulted in an increase of mass and of volume and have thus also increased the costs.

In order to avoid these disadvantages it also has been proposed to employ a double T-profile section from light construction materials and using low-cost materials as a support construction for the laser resonator. However, such constructions have not been generally accepted so far since with the materials so employed, such as aluminum and steel sheet, even with a temperature variation of only one degree centigrade considerable maladjustments of the laser resonant cavity occur due to environmental and operational climate effects, such that the quality of the laser beam and the laser output power are degraded so far that a working and treatment of the material or structure to be machined or milled could not be assured under the quality requirements imposed. A shielding of such climatic influences or, respectively, temperature variations cannot be achieved with sufficient success by expensive insulation steps or by operational stabilizations such as stabilization of the cooling water temperature, stabilization of the fed in electric energy or the like. Thus it has to be concluded that the requirements necessarily to be imposed for the operation of such a laser regarding temperature stability can be achieved only under unacceptably high costs and appear therefore to be substantially uneconomical or, alternatively, they defeat or overcompensate the advantages conceptually achievable with the light construction method.

SUMMARY OF THE INVENTION

1. Purposes of the Invention

It is an object of the present invention to provide a method for compensating maladjustments caused by environmental or operational changes of laser resonant cavities in a folded set-up together with a corresponding electronics and apparatus, which overcomes substantially the described disadvantages and which results in the set-up of low cost and powerful lasers of the kind stated with a substantially reduced mass and volume under lower materials requirements, and which meet simultaneously the requirements to be imposed on the temperature stability.

It is another object of the present invention to provide laser resonant cavities in a folded arrangement and of light materials, which allows for an automatic compensation of the positioning of the optical elements with high precision in case of thermally induced maladjustments.

It is a further object to provide a light construction laser resonant cavity which can guarantee a high beam quality over the temperature range normally employed under industrial conditions and which meets fully the requirements to be imposed for the machining and working of the materials.

These and other objects and advantages of the present invention will become evident from the description which follows.

2. Brief Description of the Invention

The present invention provides a method for compensating operational and/or environmental maladjustments of laser resonant cavities in folded systems which comprises employing a light construction support structure, disposing the optical components on three point supports mounted to the construction support structure, feeding thermal carrier medium heated to a temperature above room temperature through the supports of optical components, sensing temperatures at the support structure, sensing a maladjustment of the resonant cavity system, feeding the maladjustment signals to a control cirucuit to provide a control signal, and adjusting the temperature of the thermal carrier system depending on the maladjustment signal received for correcting the misalignment of the laser resonant cavity.

The maladjustment of the system can be sensed by measuring the temperature at independent locations on the construction support structure. The maladjustment can alternatively be sensed by measuring the output signal of the laser. The laser resonant cavity can be provided as a folded system and the light construction support as a double T-support profile. The threepoint supports of materials of different thermal expansion coefficients of the optical elements can be adjusted at standard temperature and the heat carrier medium can be passed through the supports of all optical component elements. The heat carrier medium is brought from a standard temperature TN to a defined higher temperature level TA and serves as an adjustment medium for the positioning of the optical elements.

Both in the starting phase as well as during the operating phase of the laser the maladjustments and/or the factors causing the maladjustments occurring can be sensed and the resulting signals can be evaluated in a corresponding control circuit such that the temperature of the thermal carrier medium starting at an operating point determined by an elevated temperature TA is changed depending on the direction of the maladjustment such that upon the occurrence of maladjustments the thereby caused defined changes of the temperature of the thermal carrier medium flowing through the respective supports in each case adjusts the position of all optical components in the amount required based on the different longitudinal expansion of the respective three point supports, and the maladjustment present in each case is compensated with high accuracy. The threepoint support for those optical elements, which are not disposed at deflection prisms, can be provided as a triangle with edges of equal size, which triangle is disposed such that the base of the triangle, which serves at the same time as a tilt axis, is horizontally disposed and runs at the same time in parallel to the upper or lower edge of a double T-profile serving as a construction support. Thermally adjusting pins can be employed for the threepoint support of high precision and they can be made from materials of differing thermal expansion coefficients with defined dimensions. Pins providing for readjustment with clearance fit into support provisions can be provided and they can appropriately be secured against turning. The remaining support pins can be rigidly disposed and are made from a material like that of the supports for the optical components, and the pins providing readjustment are disposed oppositely to the tilting axis in each case and are on top or at the bottom depending on the thermal expansion coefficient of the pin in each case being smaller or larger than the rigidly disposed pin.

Precisely adjusted mirrors, which are disposed on beam deflecting surfaces of beam deflecting prisms required for the reversal of the path of the laser beam, can be supported with a threepoint support of pins with differing thermal expansion coefficients, where the bases corresponding to the threepoint triangles are alternatingly running at top or bottom of the triangles and parallel to the longitudinal edge of the beam deflection faces such that the two triangles are disposed oppositely rotated by an angle of 180 degrees with respect to each other. The pins effecting the readjustment with a clearance fit depending on the relation of the thermal coefficients in each case are disposed as pairs either at the outer or at the inner base points of the corresponding triangles such that two parallel running tilt axes result on the two sides running at an angle of about 30 degrees relative to the axis of the beam deflecting prism for fully balancing in addition to the adjustment of the beam deflecting angle also the height level error resulting from a one side only position change by the equal, but oppositely directed, height level adjustment of the two mirrors based on a defined change of the temperature of the thermal carrier medium. A pin is disposed oppositely to the base of the triangles present, also in a clearance fit and of a material with a thermal expansion coefficient different from that of the other pins, and in the case of a simultaneous temperature caused tilting of the total beam deflection prism, which would cause a vertical maladjustment of the laser, the height level deviation caused by the recited, defined temperature change is sufficiently and uniformly compensated. A beam decoupling optics disposed at the resonant cavity is adjusted in the horizontal and the vertical direction by three appropriate set pin screws. These set pin screws are inserted into recesses, are produced from materials of differing thermal expansion coefficients, and form a right angle. One arm of the right angle is vertical and the other arm is horizontal to the upper or, respectively, lower edge of a double T-profile section. The two arms can be employed as tilting axes for the horizontal or, respectively, vertical readjustment such that the support body for the support of the set screws for the vertical adjustment, which is disposed at the end point of the vertically running arm, is passed by the thermal carrier medium employed and balances vertical maladjustments substantially caused by the ambient temperature changes with the temperature change of the thermal carrier medium. The other two triangle pins can be furnished with differing thermal expansion coefficients relative to each other without being passed closely by the thermal carrier medium such that small side maladjustments possibly caused by temperature changes can be automatically balanced.

Thermal carrier medium can be fed independently to each of the support units of the optical components of the laser resonant cavity. Ambient temperature caused maladjustments of the laser resonant cavity can be balanced by controlling the temperature of the supports of the optical elements of the cavity with a flow of thermal carrier medium and by providing support pins for the optical components of differing thermal expansion coefficient materials. The laser resonant cavity can be supported with a double T-section profile where the laser beam runs along each of the inner sides of the double T-section profile. The temperature can be sensed near the ends and near the top and bottom of the double T-section profile.

There is also provided a laser resonant cavity with a folded layout and compensation of the maladjustments caused by ambient temperature changes. An I-profile section is furnished for supporting the elements of the laser resonant cavity. A first mirror support is mounted on a first end of the I-profile section. A passage for liquid thermal carrier medium is provided in the first mirror support mount. A reflection mirror is mounted on the first mirror support. A beam deflection prism is mounted to the second end of the I-profile section for deflecting the laser beam by about 180 degrees. A passage is provided near the deflection prism for passing thermal carrier medium. Mounting provisions are attached to the beam deflection prism for mounting two mirrors for reflecting the laser beam. Two reflection mirrors are mounted on the mounting provisions. A support body is provided for supporting a beam decoupling optics mounted on the first end the the I-profile section. A passage is provided in the support body for passing thermal carrier medium. A beam decoupling optics is mounted on the support body. Sensing elements are disposed such that they are responsive to the alignment status of the laser beam. A control circuit is fed by signals from the sensing elements. A heater is disposed to exchange thermal energy with the thermal carrier medium and is connected to the control circuit for regulating the temperature of the thermal carrier medium. Conduits for the thermal carrier medium are connected to pass carrier medium to the area about the heater, to the first mirror support, to the passage near the deflection prism and through the passage of the support body.

A sensing element can sense the output beam of the laser and can be connected to the control circuit for adjusting the heat output of the heater for the thermal carrier medium correspondingly. A reset part of the control circuit can control the frequency of inputting the sensed signal into the control section of the circuit. A proportional part can provide an output signal proportional to the input signal. An integral part can integrate the signal size over time and a rate part can be sensitive to the speed of the changes in the sensed signal.

Support pins can determine the position of the first reflection mirror relative to the first mirror support, the position of the two reflection mirrors mounted on the mounting provisions and the position of the beam decoupling optics relative to the support body. In each case three pins are employed for the determination of the position of each of the above set forth optical components and at least one of the in each case three pins is of a material of a thermal expansion coefficient differing from those of the other two pins and such pin is provided with a clearance fit in a recess of the support while at least one of the remaining two pins is rigidly mounted in the support structure.

Suitable measurement sensors are disposed at the upper and lower cover face of the I-profile section for sensing temperature gradients in the I-profile section caused by ambient or operationally caused temperature changes both during the start-up phase of the laser as well as during equilibrium operation and, in particular at least one temperature sensor is disposed at the upper and the lower cover face of the I-profile section for sensing a vertical temperature gradient, and at least one sensor pair is disposed on top and bottom and symmetrical to the middle axis of the I-profile section for determining a possibly also present horizontal temperature gradient in the longitudinal direction of the I-profile section, where the upper and, respectively, the lower sensor elements are balanced such that they provide a null difference signal at the temperature of the thermal carrier medium in the case of an ideally adjusted laser, while in the case of the presence of a temperature gradient in the I-profile section of the resonant cavity construction, the difference of the measurement signals of the upper and lower sensor or, respectively, of the series connection of the upper and lower sensor represents a measure for the temperature gradient present in each case in the I-profile section and is defined as the reference input for the temperature of the thermal carrier medium.

Two measurement sensors can be disposed on the side of the laser beam decoupling optics at the circumference above and below the laser beam vertically on top of each other for the direct sensing of the presence of laser resonant cavity maladjustments during stationary operation and are connected in series such that in case of an ideally adjusted laser a difference null signal is provided while both in the case of a vertical deviation of the laser beam as well as in the case of a change of the intensity distribution in the laser beam a difference signal is generated, the coordinated polarity of which is a measure for the present vertical maladjustment direction and the size of which represents a measure for the maladjustment degree and which at the same time serves as a reference signal for the temperature of the thermal carrier medium employed.

A thyristor circuit can provide power to a following heater for providing a certain defined temperature to the thermal carrier medium. A proportional-integral follower controller can include an amplifier, a capacitor and four resistors, which maintain the set temperature TA of the thermal carrier medium constant and which are employed via a thermistor based on the set point controller. A temperature gradient evaluation circuit can determine temperature gradients in the I-profile section and can include an amplifier with an amplification factor adjustable and following to two thermistors. The amplification factor effects a defined change of the temperature of the thermal carrier medium employed via a proportional-integral follower controller by changing of the reference point by a resistor upon occurrence of a temperature gradient. A laser beam measurement provision with adjustable amplification factor can effect by its output signal a defined change of the temperature of the thermal carrier medium in case of a vertical deviation in the position of the laser beam or in case of a change of the intensity distribution in the laser beam, and the measurement provision is employed via a proportional-integral follower controller. A reference value connection switch comprises a time delay unit and a predisposed selection switch as well as a corresponding switchover contact, where the switching circuit is laid out such that in case of a turned off time delay unit the system control both during the start-up phase of the laser as well as during the stationary state is provided via the reference value formed from the temperature gradient, while in the case of a connected time delay unit the system control is determined only during the start-up phase by the present temperature gradient and after the passage of the time set at the time delay unit the switch contact is switched and the system control is picked up by the reference signals resulting from the direct sensing of the laser beam.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

In accordance with the present invention there is provided a laser resonator cavity in a folded arrangement, where the support construction is provided by a double T-profile section constructed in light weight fashion, which is preferably disposed with its middle part vertical. The method according to the present invention is characterized by employing a medium such as water, oil or the like flowing through the supports or mountings of all optical components. The medium is brought from an incoming or, respectively, standard temperature TN to a defined higher temperature level TA and is used a a temperature setting medium for the optical building components. The medium serves to compensate operationally and/or environmentally caused maladjustments of the laser resonant cavity.

For this purpose, the optical components including deflection mirror and beam decoupling disk are in each case disposed on a threepoint support 14 comprising materials of differing thermal expansion coefficients, which supports are exactly adjusted and aligned at the higher temperature level TA. Maladjustments of the laser occurring and/or the factors causing the maladjustments and in particular the temperature gradients occurring in the double T-profile section of the resonant cavity are determined both at the start-up phase of the laser as well as during equilibrium operation. They are evaluated in an appropriate control circuit and are defined as reference values for the thermal carrier medium such as water.

This is provided such that the temperature of the thermal carrier medium is increased or decreased depending on the maladjustments present and starting from a working point determined by the increased temperature TA. The position of of all optical building components are readjusted in the amount required and in each case the maladjustment present is compensated with high accuracy in case of maladjustments occurring and the therefrom following change of the temperature of the thermal carrier medium flowing through the support mountings is in each case based on the different longitudinal expansion of the the point supports.

The optical building components, in particular the deflection mirrors, which are not disposed at the deflection prisms, are supported on a threepoint support 14, which preferably is disposed as a triangle with equal size edges. This triangle or, respectively, its support pins forming the corner points of this triangle, is disposed such that its base, which at the same time serves as a tilt axis during the readjustment, is disposed horizontally and parallel relative to the upper or lower edge of the double T-profile section 1. The corresponding threepoint supports 14 comprise thermo-adjusting pins of highest precision and made of materials with differing thermal expansion coefficients and with defined dimensions. Here the support pins, which cause the readjustment to occur, are fitted into the mountings with a so-called clearance fit and are secured in an appropriate way against turning, while the remaining support pins comprise the same material as the mounting and are rigidly fitted into the mounting. The position of the support pins is such that the pins, fitted with a clearance fit and effecting the readjustment, are disposed oppositely relative to the tilt axis, the end points of which are provided by the rigidly disposed pins, in each case, and in fact above or below depending on whether the thermal expansion coefficient of the support pin in each case is smaller or larger than that of the rigidly attached pins.

Figure 2:
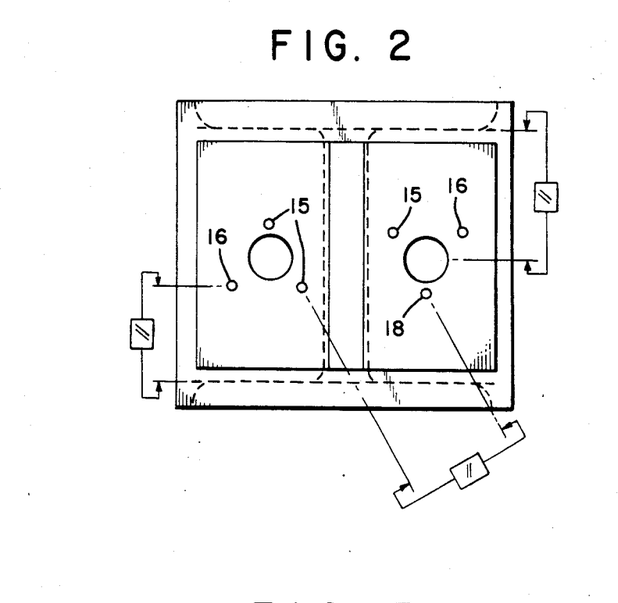
FIG. 2 is a side elevational view of the deflection prism end of the laser resonant cavity in the direction B of FIG. 1.

The accurately adjusted mirrors 5 disposed at the beam deflection faces 17 of the beam deflection prisms 4 are also positioned on threepoint supports 14 of pins with differing thermal expansion coefficients in the invention construction for compensating temperature induced changes of the beam back deflection angle of the beam deflection prisms 4 required for the backfolding of the laser beam. Here the threepoint supports 14 are preferably provided as triangles with equal edges, the bases of which in each case are alternatively at the top or at the bottom parallel to the longitudinal edges of the beam deflection faces 17 such that two triangles rotated by about 180 degrees stand opposing each other.

The pins effecting the readjustment are coordinated in pairs either to the outer or to the inner basis points of the corresponding triangles depending on the relation of the thermal expansion coefficients in each case in order to correct the beam back deflection angle such that on the two sides two parallel running tilt axes result with an angle of preferably about 30 degrees relative to the axis of the beam deflection prism 4. In addition to the accurate readjustment of the beam back deflection angle also the height level errors occurring in case of only one side adjustments are fully compensated due to the nearly equal but opposite level adjustment of the two mirrors associated with the correction at this apparatus by the defined temperature change of the thermal carrier medium such as water. In case of a simultaneous temperature caused tilting of the complete beam deflection prism 4 at the resonant cavity in the case of a horizontal disposition of the beam deflection prism, which would cause a vertical maladjustment of the laser, one of the pins disposed opposite to the bases of th triangles is employed for readjustment. This pin, which comprises a material with a thermal expansion coefficient differing from that of the other pins is also placed into position with a clearance fit and effects a sufficient compensation of the occurring level deviation based on the introduced temperature change of the thermal carrier medium, which compensation occurs simultaneously with the described angle correction.

Figure 4:
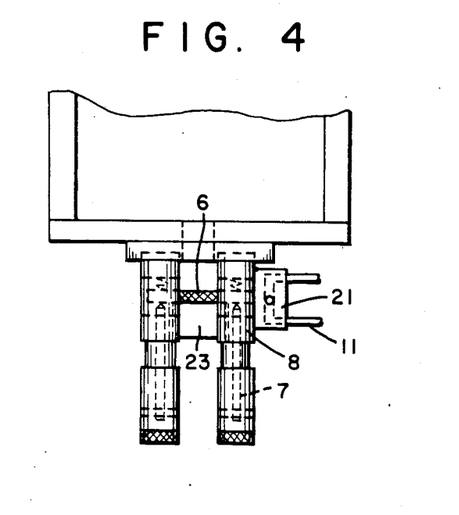
FIG. 4 is is a detail view of the decoupling part of the laser resonant cavity in the direction C of FIG. 1.

Three adjustment screws 7 of materials with differing thermal expansion coefficients are inserted into a receiving mounting 8 for readjusting the beam decoupling optics disposed at the resonant cavity, which optics can be adjusted with three adjustment screws 7 such as for example micrometer screws. The adjustment screws form a right angle where one arm is vertical and where the other arm is parallel to the upper or, respectively, lower edge of the double T-profile section, where the two arms serve as tilt axes for the horizontal or, respectively, vertical readjustment. Only the receiving support body 21 which receives the adjustment screw 20 for the vertical alignment and is disposed at the endpoint of the vertically running arm, is passed by the flowing thermal carrier medium such as water such that primarily climate caused vertical maladjustments are balanced with the temperature change of the thermal carrier medium. The two other receiving provisions can also be made of materials of different thermal expansion coefficients, even though they are not passed by the present thermal carrier medium such that small side maladjustments possibly caused by changes in room temperature can also be automatically balanced.

Figure 5:
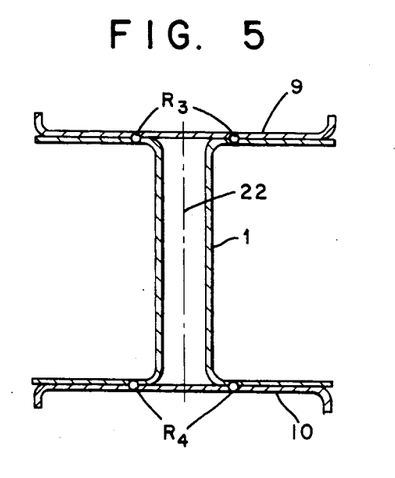
FIG. 5 is a sectional view through the double T-profile section of the laser resonant cavity along section line A—A of FIG. 1.

Suitable sensors such as for example thermistors $R_3$, $R_4$ are disposed at the upper and at the lower cover face 9, 10 of the double T-profile section in order to sense temperature gradients as they occur in the double T-profile section of th resonant cavity construction caused by ambient temperature changes and/or by the operation of the apparatus. The determination can be performed both during the start-up phase of the laser as well as during equilibrium operation. At least one measurement sensor is disposed on the top and at the bottom, or a measurement sensor on top and at the bottom symmetrically relative to the middle axis of the support in order to sense and determine the presence of a vertical temperature gradient. In each case, at least one additional pair of measurement sensors is also at the top and at the bottom and also disposed at an appropriate distance symmetrically relative to the support section middle axis in order to determine a possibly also present horizontal temperature gradient in the double T-profile section. Of course, it is also possible to provide several pairs of sensors in each case at top and bottom and also symmetrical to the support section axis and distributed at regularly spaced distances over the full length of the double T-profile section. The upper and lower measurement sensors are balanced such that for the evaluation that they deliver the difference signal null at the increased temperature TA of the thermal carrier medium, while in case of the presence of a temperature gradient in the double T-profile section of the resonant cavity construction the difference of the measurement signals from the upper and the lower measurement sensor or, respectively, from the series connections of the upper and lower measurement sensors represent a measure for the temperature gradient present in each case in the double T-profile section and this signal serves as a reference value for the thermal carrier medium.

Figure 3:
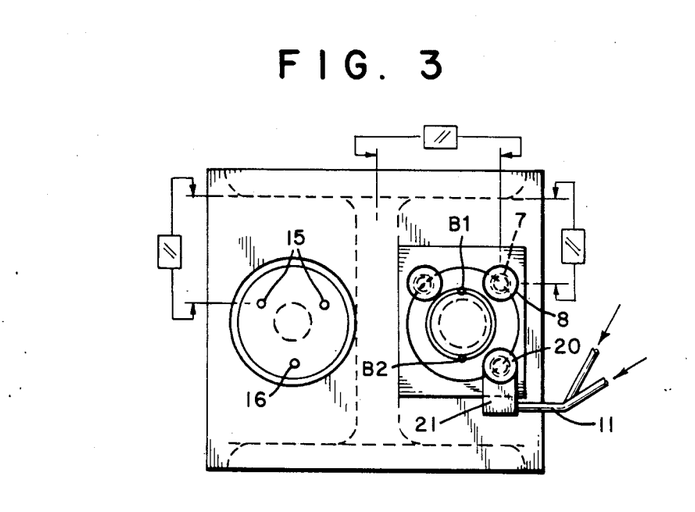
FIG. 3 is a side elevational view of the reflection mirror and decoupling part of the laser resonant cavity in the direction A of FIG. 1.

Two suitable measurement sensors or, respectively, thermoelements $B_1$, $B_2$ are disposed at the beam decoupling optics 6 in order to directly measure laser maladjustments present during equilibrium operation, such that they are disposed at the circumference of the laser beam 24 above and below vertically on top of each other. The measurement sensors are connected in series oppositely such that a difference signal zero is generated for an ideally adjusted laser, while in case of both a vertical deviation of the laser beam 24 and a change in the intensity distribution in the laser beam a difference signal is generated, the corresponding polarity of which is a measure for the vertical maladjustment direction present and the value of which represents a measure for the maladjustment degree present, which can also be employed as a reference signal for the temperature of the thermal carrier medium employed.

Figure 6:
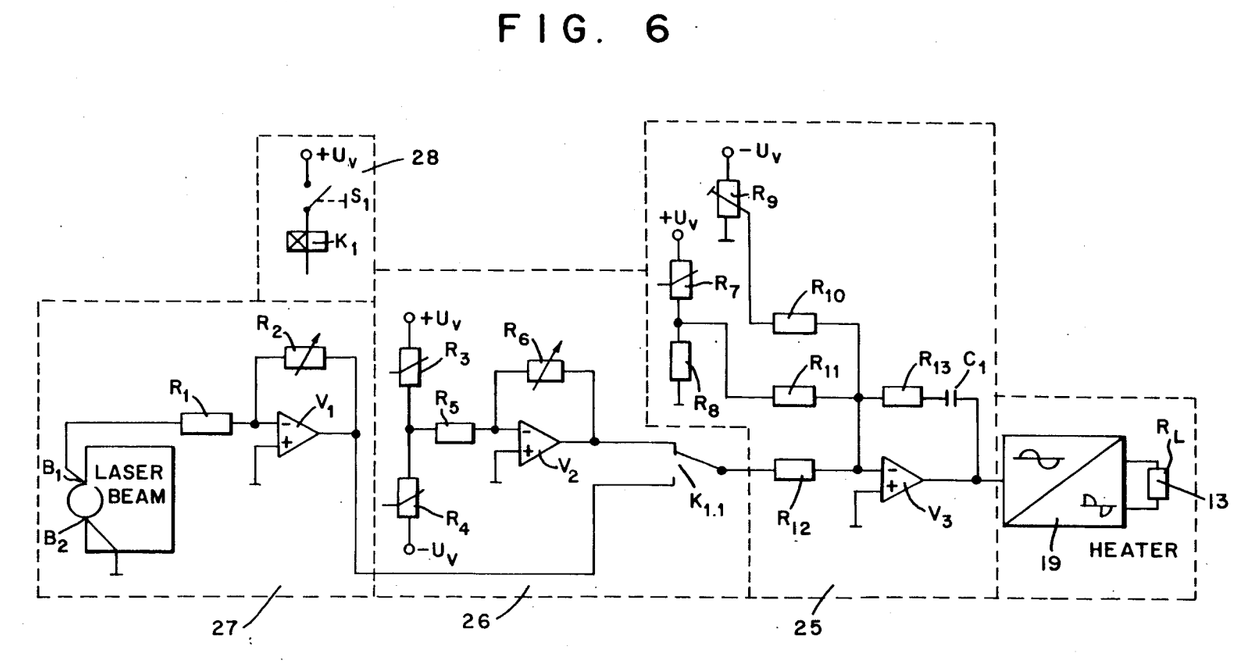
FIG. 6 is a schematic diagram of a circuit for controlling the temperature stability of the laser resonant cavity.

The circuit arrangement for performing the method of the present invention comprises the following groups of devices:

(1) A circuit section is provided comprising a thyristor final control element 19 connected to a following flow hot water heater 13 for influencing the temperature of the thermal carrier medium employed.

(2) A proportional integral controller circuit 25 comprises an amplifier $V_3$, a capacitor $C_1$ and the resistors $R_{10}$ to $R_{13}$, which circuit maintains constant the temperature TA of the thermal carrier medium employed and which circuit is set for the ideal laser state via the thermistor $R_7$ with the aid of the set point controller $R_9$.

(3) A temperature gradient determining provision 26 is placed at the corresponding double T-profile section connected via the thermistors $R_3$ and $R_4$ with the following amplifier $V_2$ with an amplification factor adjustable via the resistor $R_6$, such that in case of a temperature gradient a defined change of the temperature of the thermal carrier medium employed is effected via the proportional-integral follower controller via a change of the set point determined by $R_9$.

(4) A laser beam measurement is performed for example with the aid of thermoelements $B_1$ and $B_2$ with following amplifier $V_1$ with again adjustable amplification factor, the output signal of which also effects a defined change of the temperature of the thermal carrier medium employed via the proportional-integral follower controller in the manner described above in case of a vertical deviation of the laser beam or in case of a change in intensity of the laser beam.

(5) A switching of the reference values is performed via a time delay circuit part $K_1$ with a predisposed selection switch $S_1$ as well as a corresponding switchover contact $K_{1.1}$.

(6) The circuit arrangement can be laid out such that in case of a switched off time delay circuit component part $K_1$ the control of the system both in the start-up phase as well as in the equilibrium state is performed via the reference value resulting from the temperature gradient, while in case of a switch connected time delay component part $K_1$ the system control is determined only in the start-up phase by the temperature gradient present and where after running of the time set at the time delay component circuit $K_1$ with the switchover of the contact $K_{1.1}$ the system control is taken over by the reference value resulting from the direct measurement of the laser beam.

Figure 1:
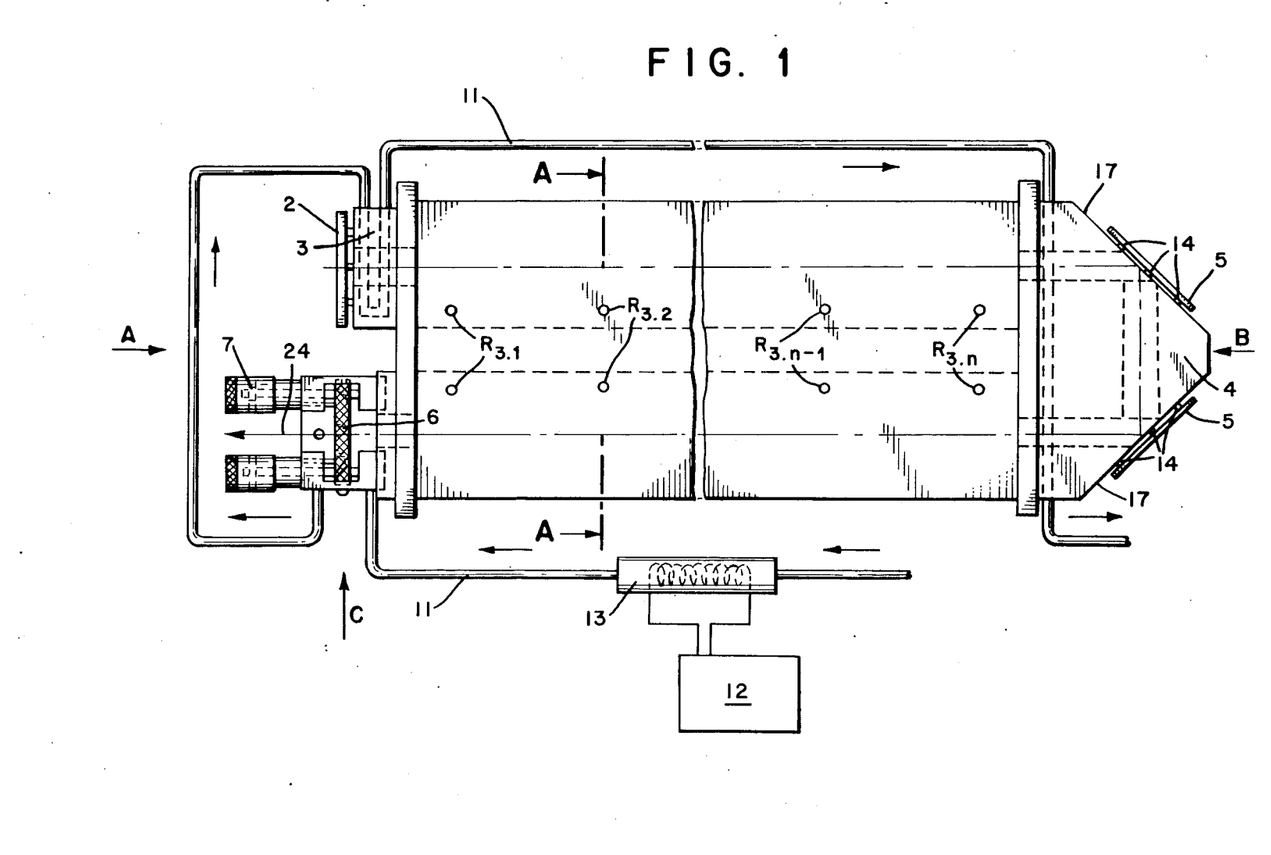
FIG. 1 is a schematic planar view of the laser resonant cavity with a folded beam.

The support construction for the laser resonant cavity comprises a double T-profile section 1 set up in a light weight construction manner. The optical components reflection mirror 2 with mirror support 3, beam back deflection prism 4 with corresponding beam deflection mirros 5 as well as the adjustable beam decoupling optics 6 are disposed on the support construction. The micrometer screws 7 are attached to corresponding support bodies 8 for the adjustment of the beam decoupling optics 6. The fluid passages of the support elements allow the passing of a suitable thermal carrier medium such as water via a corresponding line 11 thereby influencing the temperature of the respective supports. In accordance with the present invention, this thermal carrier medium is brought from an incoming temperature TN to a defined increased temperature level TA with the aid of a flow hot water heater 13 controlled by a suitable control circuit 12 and the thermal carrier medium of increased temperature is used for the readjustment of the positions of the optical building components 2, 5, 6. For this purpose the optical building components in each case are disposed at a three point support 14 precisely adjusted at the increased starting temperature TA of the thermal carrier medium, where the three point support comprises materials with differing thermal expansion coefficients. In case of the three-point support 14 of the reflection mirror 2 (FIG. 3), the support points comprising thermo-adjustable pins 15, 16 of highest precision form preferably a triangle with equal length edges and the base of the triangle serves as a tilt axis and runs parallel to the upper edge of the double T-profile section 1.

The support pins 15 disposed at the corner points of the threepoint supports 14 are made from steel just as the corresponding mirror support 3 and they are solidly pressed into the same. The pin 16 disposed oppositely to the tilt axis effects the readjustment and comprises aluminum and is in contrast fitted into the mirror support 3 and is secured against rotation in an appropriate way.

The micrometer screws 7, 20 serve to adjust the beam decoupling optics 6 and the micrometer screws 7, 20 are inserted and set into corresponding support bodies 8, 21 of materials with differing thermal expansion coefficients. Here the micrometer screws form a right angle, one arm of which is vertical and the other arm of which is parallel to the upper edge of the double T-profile section 1. The two arms serve as tilt axes for the vertical or, respectively, horizontal readjustment, where in particular for the vertical readjustment the support body 21 for receiving the micrometer screw 20, which is disposed at the endpoint of the vertical arm, is passed by the thermal carrier medium employed for the vertical readjustment.

According to the present embodiment thermistor pairs $R_{3,1}$ to $R_{3,n}$ are disposed at the upper cover face 9 and corresponding thermistor pairs $R_{4,1}$ to $R_{4,n}$ are disposed at the lower cover face 10 of the double T-profile section 1 symmetrically relative to the support middle axis 22 at regular distances over the full length of the profile section. In order to gather the measurement values the series connections of all the upper thermistors $R_{3,1}$ to $R_{3,n}$ and of all the lower thermistors $R_{4,1}$ to $R_{4,n}$ are connected opposite to each other, where the circuit is balanced such that in the case of an ideally adjusted laser and at the increased temperature TA of the thermal carrier medium employed the difference signal null results, while in case of the presence of a temperature gradient the difference of the measurement signals of the two serial connections $R_3$ and $R_4$ represents a measure for the temperature gradients present in each case.

Two thermoelements $B_1$ and $B_2$ are disposed above and below the laser beam 24 in the direction of the beam behind the beam decoupling optics with the aid of the support provision 23 and are oppositely connected in series for assessing the presence of laser maladjustments during equilibrium operation of the laser. In case of an ideally adjusted laser a difference signal of zero is generated based on the opposite series connection of the two thermoelements, while both in case of a vertical deviation of the laser beam 24 as well as in case of a change of the intensity distribution in the laser beam 24 there is generated a difference signal, the coordinated polarity of which is a measure for the vertical maladjustment direction present and the size of which is a measure for the degree of maladjustment.

The circuit for the realization of the temperature control of the thermal carrier medium employed comprises a thermistor current control element 19 with a following connected flow or instant how water heater 13. Preferably, an electric coil is immersed like an immersion heater or a heat exchanger in a line passing the thermal carrier medium. Alternatively, it is possible to employ a storage hot water heater and to withdraw the thermal carrier medium from the storage, but in this case it could take more time to respond to changes in the temperature balance of the apparatus. In addition, it is possible to control not only the temperature of the thermal carrier medium, but to control also the amount of thermal carrier medium passing through the passages of the supports of the optical components.

Furthermore, it is not necessary that all passages of the support elements are connected in series. The passages of the support elements can also be connected in parallel and in such case an individual control of the temperature and flow speed of the thermal carrier medium through each support can be provided each depending on a separate circuit part fed from appropriately disposed sensing elements. The separate control of the individual supports can compensate more than one kind of independent maladjustment such as for example vertical displacement of the beam, horizontal displacement of the beam and deformation of the beam. The evaluation of the various reference signals coming directly or via amplifiers from the measurement sensors is preferably performed by digitizing the signals followed by processing in a microprocessor according to the influences exerted by the changes of the various signals on the focussing of the laser beam. The setting of the microprocessor can be done empirically or according to theory. A further thermal stabilization of the apparatus of the present invention is achieved by providing the inner space of the double T-profile section for example around point 22 in FIG. 5 as a volume to be filled and/or passed by a thermal carrier medium resulting in an additional temperature stabilization of the apparatus and as a further way of slowly modifying the thermal state of the apparatus. It is noted that such a provision of filling the double T-profile section with a high thermal capacity liquid would not increase appreciably the weight involved in transporting the apparatus.

The thyristor current control 19 is controlled by a proportional-integral follower controller 25, which comprises the circuit components amplifier $V_4$, capacitor $C_1$ and the resistors $R_{10}$ to $R_{13}$ and which maintains the temperature TA constant, which is set for an ideal laser with the aid of the set unit $R_9$, via the thermistor $R_7$. The monitoring of the temperature gradient in the double T-profile section is provided by the circuit part 26 via series connections of the thermistors $R_{3,1}$ to $R_{3,n}$, and their average values are fed via the resistor $R_5$ and the amplifier $V_2$ to the input of the proportional-integral follower controller 25. The amplification factor, which in case of a temperature gradient effects a defined change of the temperature of the thermal carrier medium employed, is set via the resistor $R_6$. The measurement of the laser beam is performed via the switching part 27 with the aid of the thermoelements $B_1$ and $B_2$ with following amplifier $V_1$, the amplification factor of which is set via the resistor $R_2$. In case of a vertical deviation of the position of the laser beam 24 or inn case of an intensity change in the laser beam 24 a standard signal is provided by the amplifier $V_1$ and the signal can be employed for controlling the proportional-integral follower controller 25. Finally, the switching circuit is also provided with a switchover 28 for the reference signals, which comprises a time delay circuit component $K_1$ with a predisposed selection switch $S_1$ as well as a corresponding switching contact $K_{1,1}$. The circuit is laid out such that in case the time delay circuit $K_1$ is switched off the control of the system is performed both during the start-up phase of the laser as well as during the equilibrium state via a reference signal formed from the temperature gradients. In case of a connected time delay circuit part $K_1$ the system control is provided only during the start-up phase by the temperature gradient present and after the passage of the time set at the time delay circuit part $K_1$ the contact switch $K_{1,1}$ is switched over and the system is controlled by the reference signal resulting from the direct measurement of the laser beam.

It will be understood that each of the elements described above, or two or more together, may also find a useful application in other types of laser system configurations and thermal stabilization procedures differing from the types described above.

While the invention has been illustrated and described as embodied in the context of a stablization of laser cavities, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, farily constitute essential characteristics of the generic or specific aspects of this invention.

What is claimed as new and desired to be protected by Letters Patent is set forth in the appended claims.

1. A method for compensating operational and/or environmental deficiencies in adjustment of laser resonant cavities in folded systems comprising
    providing a light construction support structure;
    disposing the optical components on three point supports mounted to the construction support structure;
    feeding thermal carrier medium heated to a temperature above ambient room temperature through the supports of optical components;
    sensing temperatures at the support structure;
    sensing a deficiency in adjustment of the resonant cavity system;
    feeding signals corresponding to a sensed deficiency in adjustment to a control circuit to provide a control signal; and
    adjusting the temperature setting of the thermal carrier system with the control signal coming from the control circuit for correcting the misalignment of the laser resonsant cavity, which control signal in turn depends on the signal corresponding to deficiencies in adjustment received.

2. The method for compensating the deficiencies in adjustment of a laser resonant cavity according to claim 1 wherein the deficiency of adjustment of the system is sensed by comparing the temperature at independent locations on the construction support structure.

3. The method for compensating the deficiencies in adjustment of a laser resonant cavity according to claim 1 wherein the deficiency in adjustment is sensed by measuring the output signal of the laser.

4. The method for compensating the deficiencies in adjustment of a laser resonant cavity according to claim 1 further comprising providing the laser resonant cavity as a folded system and
    forming the light construction support as a double T-profile section, where the resonant cavity is placed next to the two elongated recesses of the double T-profile.

5. The method for compensating the deficiencies in adjustment of a laser resonant cavity according to claim 1 further comprising
    adjusting the threepoint supports of materials of different thermal expansion coefficients of the optical elements at standard ambient room temperature; and
    passing through the supports of all optical component elements the heat carrier medium, which is brought from a standard temperature TN to a defined higher temperature level TA and which serves as an adjustment medium for the positioning of the optical elements.

6. The method for compensating the deficiencies in adjustment of a laser resonant cavity according to claim 1 further comprising
    sensing both in the starting phase of the laser as well as during the operating phase of the laser variables relating to the deficiencies in adjustment occurring and
    evaluating the resulting signals in a corresponding control circuit such that the temperature of the thermal carrier medium starting at an operating point determined by an elevated temperature TA is changed depending on the direction of the deficiency of adjustment such that upon the occurrence of deficiencies in adjustment the thereby caused defined changes of the temperature of the thermal carrier medium flowing through the respective supports in each case adjusts the position of all optical components in the amount required based on the different longitudinal expansion of the respective three point supports and the deficiency in adjustment present in each case is compensated with high accuracy.

7. The method for compensating the deficiencies in adjustment of a laser resonant cavity according to claim 1 further comprising
    providing the threepoint support for those optical elements, which are not disposed at deflection prisms, as a triangle with edges of equal size, which triangle is disposed such that the base of the triangle, which serves at the same time as a tilt axis, is horizontally disposed and runs at the same time in parallel to the upper or lower edge of a double T-profile section serving as a construction support;
    employing for the threepoint support, thermally adjusting pins of high precision and made from materials of differing thermal expansion coefficients with defined dimensions;
    inserting the pins providing for readjustment with clearance fit into support provisions and securing them appropriately against turning;
    rigidly disposing the remaining support pins made from a material like the supports for the optical components and the pins providing readjustment are disposed oppositely to the tilting axis in each case and are on top or at the bottom depending on the thermal expansion coefficient of the pin in each case being smaller or larger than that of the rigidly disposed pin.

8. The method for compensating the deficiencies in adjustment of a laser resonant cavity according to claim 1 further comprising
    supporting precisely adjusted mirrors disposed on beam deflecting surfaces of beam deflecting prisms required for the reversal of the path of the laser beam with a threepoint support of pins with differing thermal expansion coefficients, where the bases corresponding to the threepoint triangles are alternatingly running at top or bottom of the triangles and parallel to the longitudinal edge of the beam deflection faces such that the two triangles are disposed oppositely, rotated by an angle of 180 degrees with respect to each other;
    disposing the pins effecting the readjustment with a clearance fit depending on the relation of the thermal coefficients in each case as pairs either at the outer or at the inner base points of the corresponding triangles such that two parallel running tilt axes result on the two sides running at an angle of about 30 degrees relative to the axis of the beam deflecting prism for fully balancing in addition to the adjustment of the beam deflecting angle also the height level error resulting from a one side only position change by the equal, but oppositely directed, height level movement of the two mirrors based on the defined change of the temperature of the thermal carrier medium, and disposing a pin located oppositely to the base of the triangles present also in a clearance fit and of a material with a thermal expansion coefficient different from that of the other pins in case of a simultaneous temperature caused tilting of the total beam deflection prism, which would cause a vertical deficiency in adjustment of the laser, and sufficiently compensating uniformly the height level deviation caused by the recited, defined temperature change.

9. The method for compensating the deficiencies in adjustment of a laser resonant cavity according to claim 1 further comprising
   adjusting a beam decoupling optics disposed at the resonant cavity based on three appropriate set pin screws in horizontal and vertical direction, where these set pin screws are inserted into recesses, are produced from materials of differing thermal expansion coefficients, and form a right angle, where one arm of the right angle is vertical and the other arm is horizontal to the upper or, respectively, lower edge of a double T-profile section;
   employing the two arms as tilting axes for the horizontal or, respectively, vertical readjustment such that the support body for the support of the set screws for the vertical adjustment, which is disposed at the end point of the vertically running arm, is passed by the thermal carrier medium employed and balances vertical deficiencies in adjustment substantially caused by the ambient temperature changes with the temperature change of the thermal carrier medium; and
   producing the other two triangle pins with differing thermal expansion coefficients relative to each other without being passed closely by the thermal carrier medium such that small side deficiencies in adjustment possibly caused by temperature changes can be automatically balanced.

10. The method for compensating the deficiencies in adjustment of a laser resonant cavity according to claim 1 further comprising feeding thermal carrier medium independently to each of the support units of the optical components of the laser resonant cavity.

11. The method for compensating the deficiencies in adjustment of a laser resonant cavity according to claim 1 further comprising balancing ambient temperature caused deficiencies in adjustment of the laser resonant cavity by controlling the temperature of the supports of the optical elements of the cavity with a flow of thermal carrier medium and by providing support pins for the optical components of differing thermal expansion coefficient materials.

12. The method for compensating the deficiencies in adjustment of a laser resonant cavity according to claim 1 further comprising supporting the laser resonant cavity with a double T-section profile where the laser beam runs along each of the inner sides of the double T-section profile; and sensing the temperature near the ends and near the top and bottom of the double T-section profile.

13. A laser resonant cavity with a folded layout and compensation of the deficiencies in adjustment caused by ambient temperature changes comprising
   an I-profile section for supporting the elements of the laser resonant cavity;
   a first mirror support mounted on a first end of the I-profile section;
   a passage in the first mirror support mount for passing thermal carrier medium;
   a reflection mirror mounted on the first mirror support;
   a beam deflection prism for deflecting the laser beam by about 180 degrees mounted to the second end of the I-profile section;
   mounting means on the beam deflection prism for mounting two mirrors for reflecting the laser beam;
   a passage at the mounting means near the deflection prism for passing thermal carrier medium;
   beam decoupling optics;
   two reflection mirrors mounted on the mounting provisions; support body for supporting beam decoupling optics mounted on the first end of the I-profile section;
   a passage in the support body for passing thermal carrier medium;
   beam decoupling optics mounted on the support body;
   sensing elements responsive to the alignment status of the laser beam and providing an electrical response signal;
   a control circuit fed by signals from the sensing elements;
   a heater disposed to exchange thermal energy with the thermal carrier medium and connected to the control circuit for regulating the temperature of the thermal carrier medium;
   conduits for the thermal carrier medium to pass carrier medium to the area proximate to the heater, to the first mirror support, to the passage near the deflection prism and through the passage of the support body.

14. The laser resonant cavity with a folded layout according to claim 13 further comprising
   a sensing element sensing the output beam of the laser and connected to the control circuit for adjusting the heat output of the heater for the thermal carrier medium correspondingly.

15. The laser resonant cavity with a folded layout according to claim 13 wherein the control circuit comprises a reset part controlling the frequency of inputting the sensed signal into the control section of the circuit, a proportional part providing an output signal proportional to the input signal; an integral part integrating the signal size over time and a rate part sensitive to the speed of the changes in the sensed signal.

16. The laser resonant cavity with a folded layout according to claim 13 further comprising support pins for determining the position of the first reflection mirror relative to the first mirror support, for determining the position of the two reflection mirrors mounted on the mounting means and for determining the position of the beam decoupling optics relative to the support body.

17. The laser resonant cavity with a folded layout according to claim 16 wherein for the determination of the position of each of the above set forth optical components in each case three pins are employed and where at least one of the in each case three pins is of a material of a thermal expansion coefficient differing from those of the other two pins and wherein such pin is provided with a clearance fit in a recess of the support while at least one of the remaining two pins is rigidly mounted in the support structure.

18. The laser resonant cavity with a folded layout according to claim 13 wherein suitable measurement sensors are disposed at the upper and lower cover face of the I-profile section for capturing temperature gradients in the I-profile section caused by ambient or operation caused temperature changes both during the start-up phase of the laser as well as during equilibrium operation and in particular at least one temperature sensor at the upper and the lower cover face of the I-profile section for sensing of a vertical temperature gradient and at least one sensor pair on top and bottom and symmetrical to the middle axis of the I-profile section for determining of a possibly also present horizontal temperature gradient in the longitudinal direction of the I-profile section, where the upper and, respectively, the lower sensor elements are balanced such that they provide a null difference signal at the temperature of the thermal carrier medium in the case of an ideally adjusted laser, while in case of the presence of a temperature gradient in the I-profile section of the resonant cavity construction the difference of the measurement signals of the upper and lower sensor or, respectively of the series connection of the upper and lower sensor represents a measure for the temperature gradient present in each case in the I-profile section and is defined as the reference input for the temperature of the thermal carrier medium.

19. The laser resonant cavity with a folded layout according to claim 13 further comprising
two measurement sensors disposed on the side of the laser beam decoupling optics at the circumference above and below the laser beam vertically on top of each other for the direct sensing of the presence of laser resonant cavity deficiencies in adjustment during equilibrium operation and are connected in series such that in case of an ideally adjusted laser a difference null signal is provided while both in the case of a vertical deviation of the laser beam as well as in the case of a change of the intensity distribution in the laser beam a difference signal is generated, the coordinated polarity of which is a measure for the present vertical deficiencies in adjustment direction and the size of which represents a measure for the deficiencies in adjustment and which at the same time serves as a reference signal for the temperature of the thermal carrier medium employed.

20. The laser resonant cavity with a folded layout according to claim 13 further comprising
a thyristor circuit to provide power to a following heater for providing a certain defined temperature to the thermal carrier medium;
a proportional-integral follower controller including an amplifier, a capacitor and four resistors, which maintains the set temperature TA of the thermal carrier medium constant and is employed via a thermistor based on the set point controller;
a temperature gradient evaluation circuit for determining temperature gradients in the I-profile section including an amplifier with an amplification factor adjustable and following to two thermistors, where the amplification factor effects a defined change of the temperature of the thermal carrier medium employed via a proportional-integral follower controller by changing of the reference point via a resistor upon occurrence of a temperature gradient;
a laser beam measurement provision with adjustable amplification factor effecting via its output signal a defined change of the temperature of the thermal carrier medium in case of a vertical deviation in the position of the laser beam or in case of a change of the intensity distribution in the laser beam and employed via a proportional-integral follower controller;
a reference value connection switch comprising a time delay unit and a predisposed selection switch as well as a corresponding switchover contact, where the switching circuit is laid out such that in case of a turned off time delay unit the system control both during the start-up phase of the laser as well as during the stationary state is provided via the reference value formed from the temperature gradient, while in case of a connected time delay unit the system control is determined only during the start-up phase by the present temperature gradient and after the passage of the time set at the time delay unit the switch contact is switched and the system control is picked up by the reference signals resulting from the direct sensing of the laser beam.

* * * * *